United States Patent [19]

Kato et al.

[11] Patent Number: 4,628,376
[45] Date of Patent: Dec. 9, 1986

[54] MAGNETIC DISC UNIT

[75] Inventors: Masahiro Kato, Chichibu; Tetsu Ogawa, Hanazono, both of Japan

[73] Assignee: Canon Denshi Kabushiki Kaisha, Chichibu, Japan

[21] Appl. No.: 607,399

[22] Filed: May 3, 1984

[30] Foreign Application Priority Data

May 12, 1983 [JP] Japan .................................. 58-81713
May 13, 1983 [JP] Japan .................................. 58-82586

[51] Int. Cl.$^4$ ............................................. G11B 19/00
[52] U.S. Cl. ......................................... 360/71; 360/75
[58] Field of Search ....................... 360/71, 97, 75, 99

[56] References Cited

U.S. PATENT DOCUMENTS 4,005,485  1/1977  Opocensky ............................ 360/75
4,352,132  9/1982  Gyi ....................................... 360/97
4,375,070  2/1983  Isozaki et al. ......................... 360/75

Primary Examiner—George G. Stellar
Attorney, Agent, or Firm—Spencer & Frank

[57] ABSTRACT

A magnetic disc unit which clamps and releases a magnetic disc by a mechanism driven by a motor. The inserted magnetic disc is automatically ejected from the magnetic disc unit when a magnetic disc eject switch is depressed. A magnetic disc eject signal is so controlled by a head load signal that while the head load signal is applied, the output of the magnetic disc eject signal is inhibited. A cam mechanism for controlling a lever which operates a magnetic disc clamping mechanism can be manually operated from the exterior of the magnetic disc unit. While the head load signal is applied, the inserted magnetic disc is not ejected from the magnetic disc unit, even if the magnetic disc eject switch is erroneously depressed. Accordingly, the data in a magnetic disc is not destroyed. Regardless of a malfunction or failure of the magnetic disc unit or a host system, the inserted magnetic disc can be manually released and ejected from the magnetic disc unit.

16 Claims, 6 Drawing Figures

MAGNETIC DISC UNIT

BACKGROUND OF THE INVENTION

1. Field of the Invention

The present invention relates generally to a magnetic disc unit and more particularly to a magnetic disc unit of the type in which a motor drives a magnetic disc clamping mechanism for automatically clamping the magnetic disc and a magnetic disc releasing mechanism for automatically releasing the clamped magnetic disc.

2. Description of the Prior Art

For instance, when a magnetic disc is ejected from a magnetic disc unit while recording or reproducing due to an erroneous operation of the magnetic disc unit, erroneous data are recorded or a host system operation is interrupted.

Therefore, various safety devices have been proposed to prevent a magnetic disc eject mechanism from being actuated even when the magnetic disc is erroneously operated while it is recording or reproducing.

For instance, there has been used a mechanical safety mechanism which mechanically locks a door through which a magnetic disc is loaded into or ejected from a magnetic disc unit during the recording or reproduction mode. There has been also used a mechanical safety mechanism which locks a magnetic disc eject lever during the recording or reproduction mode.

Meanwhile, there has been proposed a magnetic disc unit in which upon insertion or loading of a magnetic disc into the magnetic unit, the magnetic disc is automatically clamped and upon depression of a magnetic disc eject button switch, the magnetic disc is automatically ejected from the magnetic disc unit (see, for instance, Japanese Patent Application Laid Open No. 177265/1982).

As described above in this unit, a magnetic disc is automatically clamped and ejected, so that the operability is improved and the centering accuracy of a magnetic disc is ensured. However, this automatic clamping and ejecting magnetic disc unit is not provided with a safety device which can protect a magnetic disc during the recording or reproduction mode when the magnetic disc unit is erroneously operated. As a result, when an eject button switch is depressed, for instance, a magnetic disc is automatically ejected from the magnetic disc unit, so that the data in the magnetic disc are destroyed.

Furthermore, since the clamped magnetic disc is automatically released and ejected only by depressing the eject button switch, the magnetic disc cannot be released and accordingly cannot be ejected from the magnetic disc unit in the case of breakdown or malfunction of a magnetic disc unit or a host system. In this case, there may be no problem when a magnetic disc is not clamped, but when the breakdown or malfunction occurs while the magnetic disc is clamped, the clamped magnetic disc cannot be ejected from the magnetic disc unit until such a breakdown or malfunction of the magnetic disc unit or host system is completely removed.

SUMMARY OF THE INVENTION

It is, therefore, an object of the present invention to provide a magnetic disc unit in which the above and other problems encountered in an automatic loading type magnetic disc unit is solved by providing a safety device for protecting a magnetic disc from an erroneous operation of the magnetic disc unit during the recording or reproduction mode.

It is another object of the present invention to provide a magnetic disc unit in which an automatic magnetic disc clamping mechanism and an automatic magnetic disc releasing mechanism can be manually operated.

The above and other objects, effects, features and advantages of the present invention will become more apparent from the following description of preferred embodiments thereof taken in conjunction with the accompanying drawings.

DETAILED DESCRIPTION OF THE PREFERRED EMBODIMENTS

Figure 1:
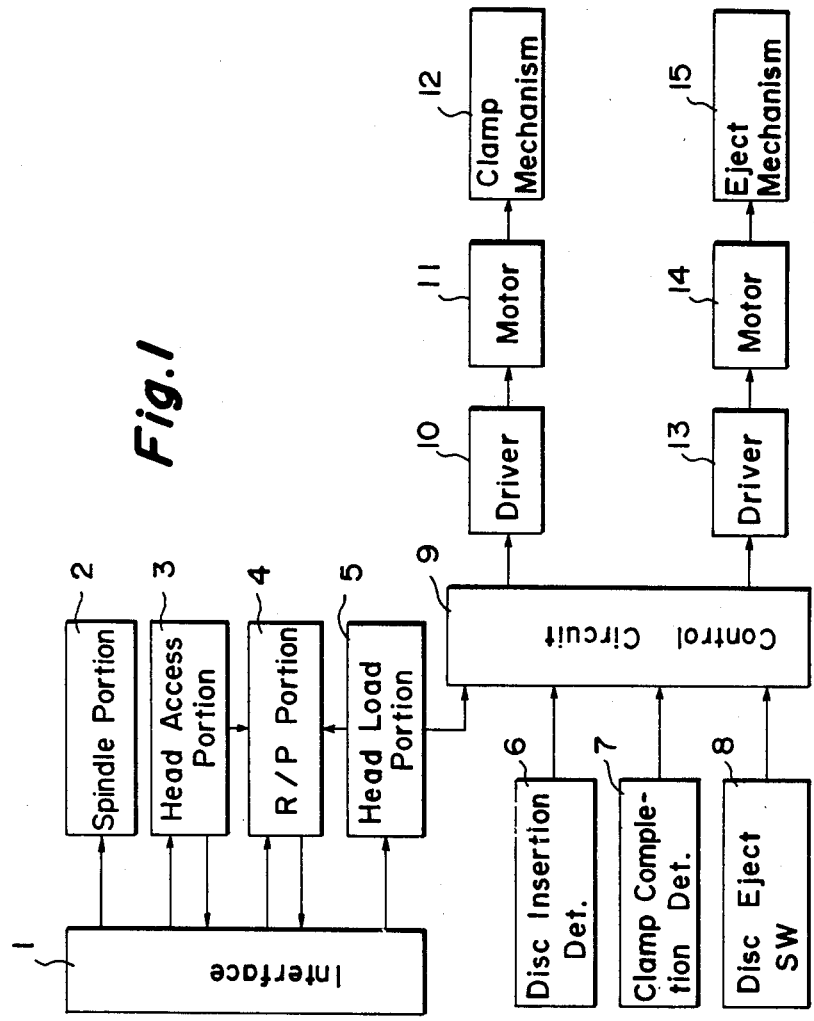
FIG. 1 is a block diagram showing one embodiment of a magnetic disc unit in accordance with the present invention.
Figure 2:
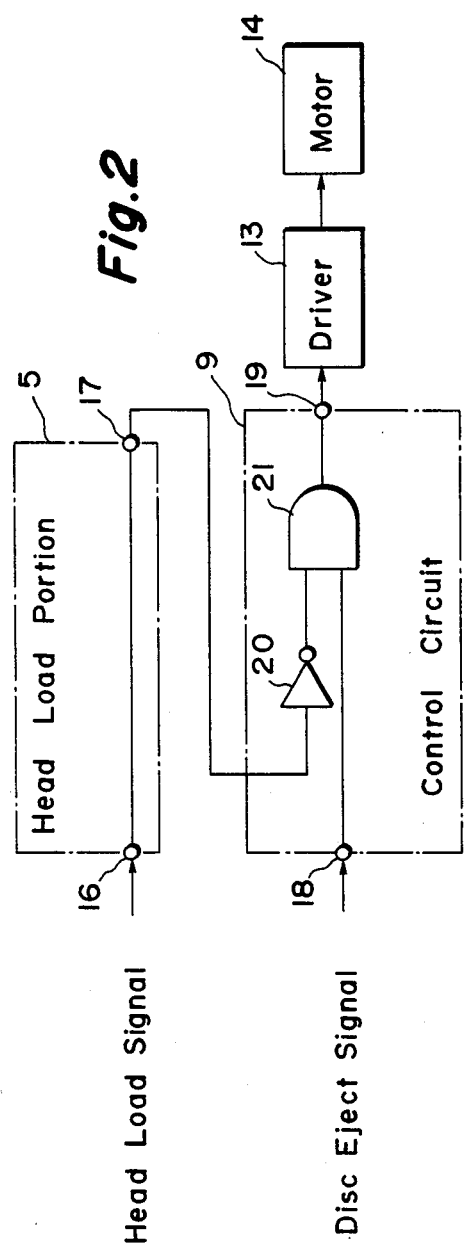
FIG. 2 is a block diagram showing one embodiment of a magnetic disc release prohibit circuit in a control circuit thereof.
Figure 3:
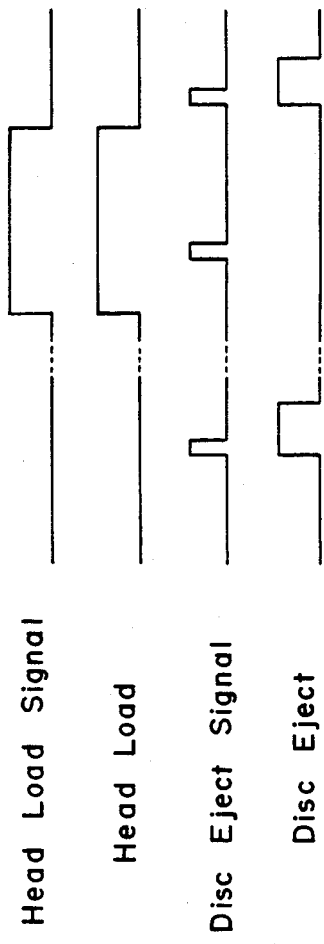
FIG. 3 illustrates a timing chart used to explain the operation thereof.

Referring to FIGS. 1-3, a first embodiment of a magnetic disc unit in accordance with the present invention will be described. FIG. 1 shows a block diagram of a control circuit of the magnetic disc unit. In FIG. 1, reference numeral 1 designates an interface through which various signals are transmitted between a host system and a magnetic disc unit and to which connected are a spindle portion 2 for driving to rotate a magnetic disc, a head access portion 3 for controlling the position of a magnetic head, a record/reproduction portion 4 and a head load portion 5 for controlling the magnetic head to contact the loaded magnetic disc or to move away therefrom. The head access portion 3 and the head load portion 5 are connected to the record/reproduction portion 4.

The head load portion 5 is connected to a control circuit 9 so as to apply a head load signal thereto. To the control circuit 9 also connected are a disc insertion detector 6 for detecting whether or not a magnetic disc is inserted, a clamp completion detector 7 for detecting whether or not a magnetic disc is clamped, and a magnetic disc eject switch 8 for ejecting the loaded magnetic disc, so that the control circuit 9 receives a disc insertion signal, a clamp completion signal and a disc eject signal.

The control circuit 9 applies a clamp drive signal to a driver 10. In response to the output signal from the driver 10, a motor 11 is driven, so that a clamp mechanism 12 is actuated to clamp a magnetic disc. The control circuit 9 also applies a eject drive signal to a second driver 13. In response to the output signal from the second driver 13, a second motor 14 is driven so that an eject mechanism 15 is actuated to eject the loaded magnetic disc.

As shown in FIG. 2, the control circuit 9 includes a magnetic disc eject prohibition circuit. The head load signal is applied to an input terminal 16 of the head load portion 5. The disc eject signal from the disc eject switch 8 is applied to an input terminal 18 of the control circuit 9 and an output terminal 19 thereof is connected to the driver 13 which in turn is connected to the motor 14. The output signal from an output terminal 17 of the head load portion 5 is inverted by an inverter 20, the output of which is applied to one input terminal of an AND gate 21. The disc eject signal from the input terminal 16 is applied to the other input terminal of the AND gate 21.

Referring next to FIG. 3, the operation of the magnetic disc unit with the above-described arrangement will be described. The insertion of a magnetic disc is detected by the disc insertion detector 6 and in response to the detection output signal from the disc insertion detector 6, the control circuit 9 drives the driver 10 to energize the motor 11, so that the clamp mechanism 12 is actuated.

When the magnetic disc is completely clamped, the clamp completion detector 7 generates a clamp completion signal, in response to which the motor 11 is de-energized.

When the disc eject switch 8 is depressed, while the magnetic disc is clamped, the disc eject signal is generated, so that the control circuit 9 drives the driver 13 to energize the motor 14 so as to actuate the eject mechanism 15.

In this case, since the control circuit 9 monitors the head load signal from the head load portion 5, the control circuit 9 does not drive the motor 14, while the magnetic head is being loaded for recording or reproduction.

That is, when the head load signal "1" is applied to the input terminal 16 of the head load portion 5, the head load signal "1" is inverted by the inverter 20 into the signal "0". As a result, regardless of the application of the disc eject signal to the input terminal 18 of the control circuit 9, the output signal derived from the AND gate 21 is always "0", so that the motor 14 is not driven.

When the recording or reproduction operation is completed, so that the head load signal is terminated, the signal level at the input terminal 16 becomes "0". Thus, when the disc eject signal "1" is applied to the input terminal 18 under the condition, the signal level at the output terminal 19 of the control circuit 9 becomes "1", so that the motor 14 is driven. As a result, the magnetic disc is ejected as shown in FIG. 3.

As described above, when the head load signal is applied to the input terminal 16 of the head load portion 5, the ejection of a magnetic disc will not be carried out even if the disc eject switch 8 is erroneously depressed. As a result, the data on the magnetic disc will be not destroyed. Therefore, the data protection is ensured, so that it is also ensured that the operation of the host system is protected.

Figure 4:
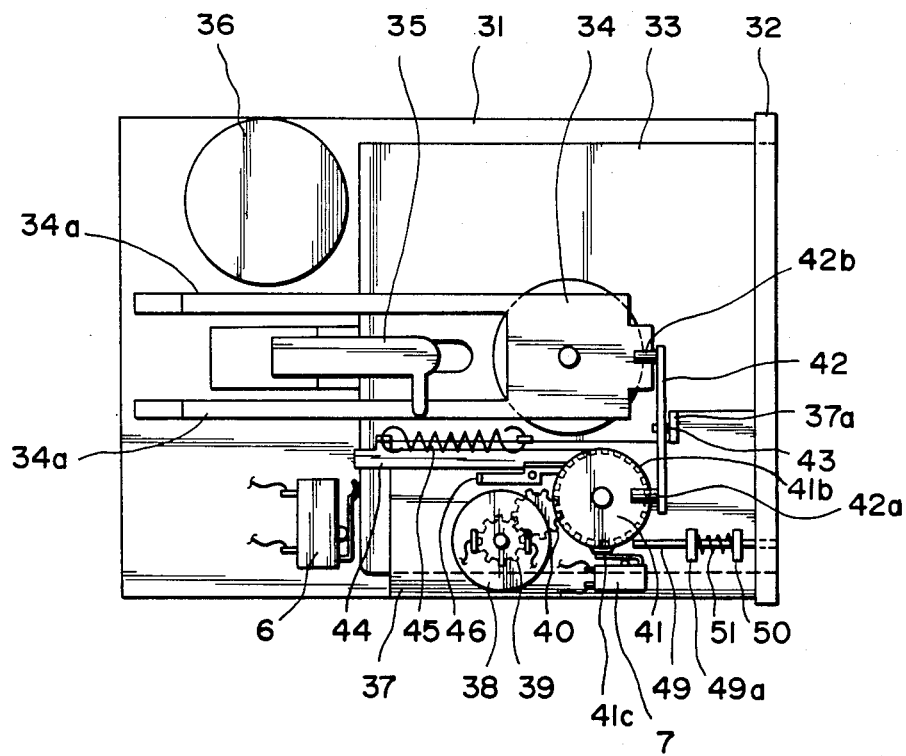
FIG. 4 is a top view showing one embodiment of a mechanical structure of a magnetic disc unit in accordance with the present invention.
Figure 5:
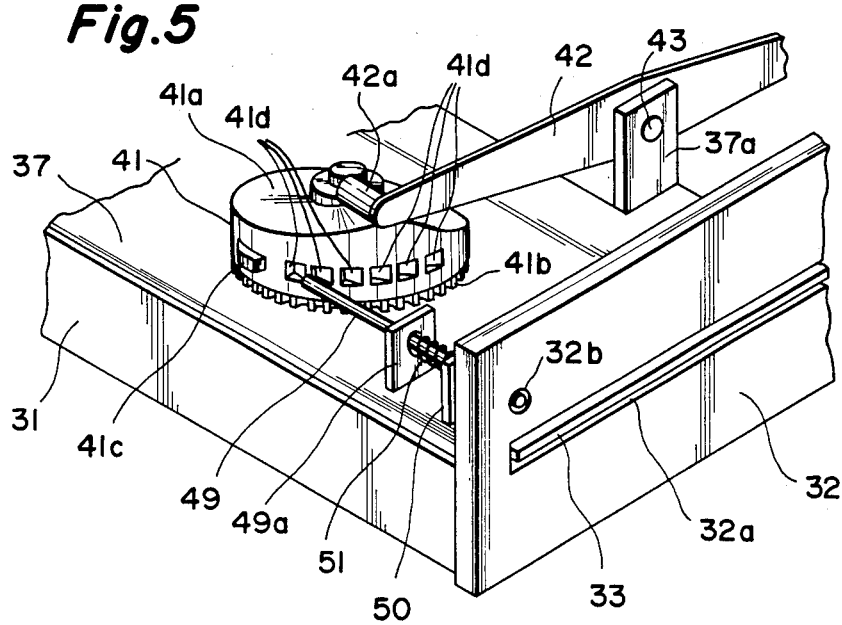
FIG. 5 is a perspective view thereof.

FIGS. 4 and 5 show one embodiment of the construction of a magnetic disc unit according to the present invention. A chassis 31 of the magnetic disc unit has a front panel 32 at one end. A magnetic disc 33 which is enclosed within a rectangular cassette is inserted through an opening 32a of the front panel 32 into the magnetic unit.

A magnetic disc clamping mechanism 34 is disposed in opposed relationship with a magnetic disc driving mechanism (not shown). The inserted magnetic disc 33 is clamped between the clamping mechanism 34 and the disc driving mechanism (not shown) in a manner that the magnetic disc 33 is driven by the disc driving mechanism.

A record/reproduction head mechanism 35 is displaced by a stepping motor 36 so as to follow the tracks of the magnetic disc 33.

The chassis 31 has a supporting plate 37 upon which mounted are mechanism for automatically clamping, releasing and ejecting a magnetic disc.

The output shaft of a motor 38 for driving this mechanism carries a gear 39 which in turn is in mesh with an intermediate or idle gear 40. A cam disc 41 with a top cam surface 41a is disposed adjacent to the idle gear 40 and a plurality of teeth 41b extended from the bottom surface of the cam disc 41 are in mesh with the idle gear 40.

A projection 41c is extended radially outwardly from the cylindrical surface of the cam disc 41 and a plurality of ratchets 41d are formed in the cylindrical surface of the cam disc 41 over a predetermined radial angle.

The center point between the ends of a lever 42 is pivotably mounted with a pivot pin 43 to a bracket 37a extended upwardly from the supporting plate 37. A roller 42a in contact with the top cam surface 41a of the cam disc 41 is carried by one end of the lever 42 and a roller 42b in contact with the upper surface of the clamping mechanism 43 is carried by the other end of the lever 42.

A spring 45 is loaded between the supporting plate 47 and an ejection plate 44, so that the ejection plate 44 is normally biased in the direction in which the magnetic disc 33 is ejected from the magnetic disc unit. The ejection plate 44 co-operates with the cam disc 41 and is locked its magnetic disc ejection operation by a latch 46 until the ejection of the magnetic disc 33 is instructed by the eject switch 8.

The detector 6 may be a limit switch which is so disposed as to detect the insertion of the magnetic disc 33, the detector 7 may be a limit switch which is so disposed as to detect the timing that the magnetic disc 33 is clamped.

A shaft 49 which is disposed adjacent to the cam disc 41 is guided by a projection 49a in such a way that the shaft 49 is movable in the direction in parallel with the direction in which the magnetic disc 33 is inserted. The shaft 49 has a spring shoe 50 on the side of the front panel 32 and a spring 51 is provided around the shaft 49 between the projection 49a and the spring shoe 50 in such a way that the shaft 49 is normally biased to move away from the cam disc 41. As a consequence, the inner end of the shaft 49 is normally failed to be engaged in the ratchet 41d of the cam disc 41. The outer end of the shaft 49 is fitted into a small hole 32b formed through the front panel 32.

Next, the operation of the construction will be described. Prior to the insertion of the magnetic disc 33, the roller 42a carried by one end of the lever 42 is made into contact with a lower portion of the cam surface 41a, so that the lever 42 is rotated in the counterclockwise direction in FIG. 2. The disc clamping mechanism 34 is shifted upwardly under the forces of arms 34a of the clamping mechanism 34. Therefore, the magnetic disc 33 can be freely inserted into the space below the clamping mechanism 34.

When the magnetic disc 33 is inserted, the insertion is detected by the detector 6, so that the motor 38 is energized. As a result, the motor 38 drives to rotate the cam disc 41 through the gears 39, 40 and 41b, so that the roller 42a rides over a raised portion of the cam surface 41a of the cam disc 41. Then, the lever 42 is rotated in the clockwise direction in FIG. 5, so that the roller 42b carried by the other end of the lever 42 presses the clamping mechanism 34 downwardly. As a consequence, the magnetic disc 33 is clamped in the manner described above.

As the cam disc 41 is rotated, its projection 41c actuates the detector or limit switch 7, so that the motor 38 is de-energized. Thus, the magnetic disc 33 is automatically clamped. Under the condition, the magnetic disc 33 is rotated and the head mechanism 35 is driven.

When it is desired to eject the magnetic disc 33 from the magnetic disc unit, the eject switch 8 (See FIG. 1) is closed to generate the disc eject signal. In response to the disc eject signal, the motor 38 is energized so that the cam disc 41 is rotated. Then, the roller 42a is shifted to the lower portion of the cam surface 41a of the cam disc 41. As a result, the roller 42b carried by the other end of the lever 42 is moved away from the clamping mechanism 34 to release the depressing of the clamping mechanism 34.

Simultaneously, the latch 46 is actuated at a predetermined timing by the cam disc 41, so that the ejection plate 44 is released and is displaced by the force of the spring 45, whereby the magnetic disc 33 is ejected from the magnetic disc unit.

When the magnetic disc 33 is ejected, the signal derived from the detector 6 changes, so that the motor 38 is de-energized. Thus, the operation of releasing and ejecting the magnetic disc 33 is completed.

If a malfunction of the magnetic unit occurs or the magnetic disc unit is failed while the magnetic disc 33 is still clamped so that the motor 38 cannot be energized, the clamped magnetic disc 33 is manually released as will be described below.

First, the pointed end of a ball point pen or the like is inserted into the small hole 32b of the front panel 32 so as to push the shaft 49 inwardly. As a result, the rear end of the shaft 49 is made into engagement with the ratchet 41d of the cam disc 41d against the spring 51, so that the cam disc 41 can be manually rotated, as the shaft 49 is pushed. When this operation is repeated several times, the cam disc 41 is rotated, so that the magnetic disc 33 is released and ejected in a manner substantially similar to that described above.

As described above, the mechanism for lowering or lifting the clamping mechanism can be manually operated from the exterior of the magnetic disc unit, so that even in the case of a malfunction of the magnetic disc unit, it is ensured that the magnetic disc 33 can be released and ejected safely.

Figure 6:
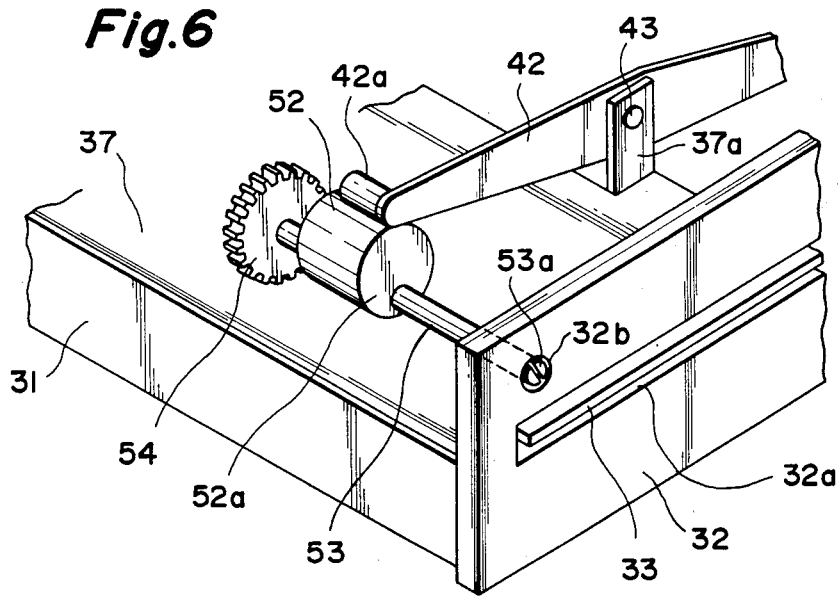
FIG. 6 is a perspective view showing another embodiment of the present invention.

FIG. 6 shows a second embodiment of the structure of a magnetic disc unit in accordance with the present invention. Same reference numerals are used to designate similar parts throughout the figure and the parts which have been already explained with reference to FIGS. 4 and 5 will not be described in the second embodiment.

According to the second embodiment of the present invention, an eccentric cam 52 is provided in contact with the roller 42a carried by one end of the lever 42, so that upon the rotation of the eccentric cam 52 the lever 42 is rotated. A shaft 53 is extended from one end surface 52a of the eccentric cam 52 and is inserted into the small hole 32b of the front panel 32. The free end of the shaft 53 fitted into the small hole 32b has a groove 53a for engagement with a screwdriver.

The other end of the shaft 53 carries a gear 54 which is coupled to the motor 38, so that the shaft 53 is rotated by the motor 38 via the gear 54.

According to the second embodiment, the eccentric cam 52 can be manually rotated by a screwdriver from the exterior of the magnetic disc unit. As a result, as is the case of the first embodiment, in the case of a malfunction or failure of the magnetic disc unit, the magnetic disc 33 can be manually released and ejected in a manner substantially similar to that described above.

As described above, according to the present invention, the mechanism for lowering or lifting the magnetic disc clamping mechanism can be operated from the exterior of the magnetic disc unit, so that even in the case of a malfunction or failure of the magnetic disc unit, it is ensured that a magnetic disc is released and ejected manually.

What is claimed is:

1. A magnetic disc unit comprising:
   magnetic disc eject signal generating means for generating a magnetic disc eject signal for automatically ejecting a magnetic disc from said magnetic disc unit;
   head load signal generating means for generating a head load signal for loading a magnetic head relative to said magnetic disc;
   prohibition means responsive to said magnetic disc eject signal and said head load signal for inhibiting the generation of said magnetic disc eject signal; and
   control means responsive to the output from said prohibition means for controlling the ejection of said magnetic disc from said magnetic disc unit.

2. A magnetic disc unit as claimed in claim 1, wherein said magnetic disc eject signal generating means comprises a disc eject switch.

3. A magnetic disc unit as claimed in claim 1, wherein said prohibition means comprises a logic circuit which responds to said head load signal to inhibit the generation of said magnetic disc eject signal.

4. A magnetic disc unit as claimed in claim 3, wherein said logic circuit comprises an inverter for inverting said head load signal and an AND gate receiving the output signal from said inverter and said magnetic disc eject signal.

5. A magnetic disc unit comprising:
   magnetic disc insertion detection means for detecting the insertion of a magnetic disc into said magnetic disc unit;
   magnetic disc eject signal generating means for generating a magnetic disc eject signal for ejecting the inserted magnetic disc from said magnetic disc unit;
   a motor which is energized in response to the output signal from said magnetic disc insertion detection means or said magnetic disc eject signal derived from said magnetic disc eject signal generating means;
   a clamping member which is driven by said motor to clamp the inserted magnetic disc;
   a control member interposed between said motor and said clamping member and responsive to the output signal from said magnetic disc insertion detection means or said magnetic disc eject signal derived from said magnetic disc eject signal generating means for controlling the operation of said clamping member;
   a magnetic disc ejection member which is controlled by said control member and which responds to said magnetic disc eject signal to eject the inserted magnetic disc from said magnetic disc unit; and a manual ejection member for manually controlling said control member from the exterior of said magnetic disc unit to release said inserted magnetic disc clamped by said clamping member and to drive said magnetic disc ejection means to eject said inserted magnetic disc from said magnetic disc unit.

6. A magnetic disc unit as claimed in claim 5, wherein said control member comprises a cam disc coupled to said motor and a lever having one end in contact with a cam surface of said cam disc so that said lever follows said cam disc and for controlling the clamping movement of said clamping member;

the cylindrical surface of said cam disc means has a plurality of ratchets; and said manual ejection member is in the form of a shaft having one end engageable with one of said plurality of ratchets, so that when the other end of said shaft is manually pushed from the exterior of said magnetic disc unit, said one end of said shaft engages with one of said plurality of ratchets to rotate said cam disc.

7. A magnetic disc unit as claimed in claim 5, wherein said control member comprises an eccentric cam coupled to said motor and a lever having one end in contact with the cylindrical surface of said eccentric cam so that said lever follows said eccentric cam and for controlling the clamping movement of said clamping member; and said manual ejection member is in the form of a shaft extended from the end surface of said eccentric cam in such a way that when the free end of said shaft is manually operated from the exterior of said magnetic disc unit, said lever rotates said eccentric cam.

8. A magnetic disc unit comprising:

magnetic disc insertion detection means for detecting the insertion of a magnetic disc into said magnetic disc unit;

magnetic disc eject signal generating means for generating a magnetic disc eject signal for ejecting the inserted magnetic disc from said magnetic disc unit;

a motor which is energized in response to the output signal from said magnetic disc insertion detection means or said magnetic disc eject signal derived from said magnetic disc eject signal generating means;

a clamping member which is driven by said motor to clamp the inserted magnetic disc, a control member interposed between said motor and said clamping member and responsive to the output signal from said magnetic disc insertion detection means or said magnetic disc eject signal derived from said magnetic disc eject signal generating means for controlling the operation of said clamping member;

a magnetic disc ejection member which is controlled by said control member and which responds to said magnetic disc eject signal to eject the inserted magnetic disc from said magnetic disc unit;

a manual ejection member for manually controlling said control member from the exterior of said magnetic disc unit to release said inserted magnetic disc clamped by said clamping member and to drive said magnetic disc ejection means to eject said inserted magnetic disc from said magnetic disc unit;

head load signal generating mean for generating a head load signal for loading a magnetic head relative to said magnetic disc;

prohibition means responsive to said magnetic disc eject signal and said head load signal for inhibiting the generation of said magnetic disc eject signal; and another control means responsive to the output from said prohibition means for controlling the ejection of said magnetic disc from said magnetic disc unit.

9. A magnetic disc unit as claimed in claim 8, wherein said magnetic disc eject signal generating means comprises a disc eject switch.

10. A magnetic disc unit as claimed in claim 8, wherein said prohibition means comprises a logic circuit which responds to said head load signal to inhibit the generation of said magnetic disc eject signal.

11. A magnetic disc unit as claimed in claim 8, wherein said logic circuit comprises an inverter for inverting said head load signal and an AND gate receiving the output signal from said inverter and said magnetic disc eject signal.

12. A magnetic disc unit as claimed in claim 8, wherein said control member comprises a cam disc coupled to said motor and a lever having one end in contact with a cam surface of said cam disc so that said lever follows said cam disc and for controlling the clamping movement of said clamping member;

the cylindrical surface of said cam disc means has a plurality of ratchets; and said manual ejection member is in the form of a shaft having one end engageable with one of said plurality of ratchets, so that when the other end of said shaft is manually pushed from the exterior of said magnetic disc unit, said one end of said shaft engages with one of said plurality of ratchets to rotate said cam disc.

13. A magnetic disc unit as claimed in claim 8, wherein said control member comprises an eccentric cam coupled to said motor and a lever having one end in contact with the cylindrical surface of said eccentric cam so that said lever follows said eccentric cam and for controlling the clamping movement of said clamping member; and said manual ejection member is in the form of a shaft extended from the end surface of said eccentric cam in such a way that when the free end of said shaft is manually operated from the exterior of said magnetic disc unit, said lever rotates said eccentric cam.

14. A magnetic disc unit comprising:

a clamping member for clamping a magnetic disc;

a control member for controlling the clamping operation of said clamping member;

a motor for driving said clamping member via said control member to perform the clamp of said magnetic disc and to release the clamping of said magnetic disc;

a clamp releasing member for driving said clamping member via said control member to manually release the clamping of said magnetic disc; and an ejecting member controlled by said control member driven to release the clamping of said magnetic disc by either of said motor and said clamp releasing member for ejecting the released magnetic disc.

15. A magnetic disc unit as claimed in claim 14, wherein said control member comprises a cam disc coupled to said motor and a lever having one end in contact with a cam surface of said cam disc so that said lever follows said cam disc and for controlling the clamping movement of said clamping member;

the cylindrical surface of said cam disc means has a plurality of ratchets; and said manual ejection member is in the form of a shaft having one end engageable with one of said plurality of ratchets, so that when the other end of said shaft is manually pushed from the exterior of said magnetic disc unit, said one end of said shaft engages with one of said plurality of ratchets to rotate said cam disc.

16. A magnetic disc unit as claimed in claim 14, wherein said control member comprises an eccentric cam coupled to said motor and a lever having one end in contact with the cylindrical surface of said eccentric cam so that said lever follows said eccentric cam and for controlling the clamping movement of said clamping member; and said manual ejection member is in the form of a shaft extended from the end surface of said eccentric cam in such a way that when the free end of said shaft is manually operated from the exterior of said magnetic disc unit, said lever rotates said eccentric cam.

* * * * *